United States Patent [19]
Schick

[11] 3,742,342
[45] June 26, 1973

[54] MEASURING TRANSDUCER WITH COMBINED POWER INPUT AND SIGNAL OUTPUT LINES

[76] Inventor: Günter Schick, Tillystrasse 9,495, Minden/Westf., Germany

[22] Filed: Oct. 12, 1970

[21] Appl. No.: 79,810

[30] Foreign Application Priority Data
Oct. 13, 1969 Germany.............. P 19 51 523.2

[52] U.S. Cl........................ 323/4, 73/308, 323/19, 323/22 Z, 323/75 S, 340/199
[51] Int. Cl....................... G01f 23/10, G01f 23/18
[58] Field of Search...................... 73/305, 308, 313; 323/4, 19, 22 T, 22 Z, 75 S; 340/187, 199, 201 R

[56] References Cited
UNITED STATES PATENTS

| | | | |
|---|---|---|---|
| 3,370,222 | 2/1968 | Haagen-Smit et al. | 323/4 |
| 3,096,504 | 7/1963 | Fieldgate et al. | 340/201 R |
| 3,555,405 | 1/1971 | Martin | 340/199 X |
| 2,758,288 | 8/1956 | Shannon et al. | 323/75 S |
| 3,251,951 | 5/1966 | Meewezen | 323/22 T |
| 3,333,469 | 8/1967 | Godfrey | 73/308 |
| 3,503,261 | 3/1970 | Riester et al. | 323/22 Z |
| 3,566,246 | 2/1971 | Seer, Jr. | 323/4 |

*Primary Examiner*—A. D. Pellinen
*Attorney*—Rolf H. Siegemund

[57] ABSTRACT

A measuring transducer for converting a quantity to be measured into an electrical signal, the transducer having but two lead-in wires for providing voltage and current to the transducer as power supply therein, and wherein the measured quantity is represented by an electrical signal that passes through resistance such as a transistor, a feedback resistor for deriving therefrom a signal that is proportional to current, and a constant voltage device such as a "Zener" diode connected in series to each other, is connected to the lead-in wires, so that at least substantially all of the power supply current passes through the adjustable resistance and a portion of the load current flows through the constant voltage device to obtain the constant voltage thereacross. The transducer has a pick-up for the quantity to be measured such as a float-operated adjustable resistor or an oscillator biased magnetic pick up device is energized by the constant voltage device and provides an electrical signal, which, together with the feedback signal adjusts the resistance so that the current represents the quantity to be measured.

10 Claims, 5 Drawing Figures

Inventor
GÜNTER SCHICK

MEASURING TRANSDUCER WITH COMBINED POWER INPUT AND SIGNAL OUTPUT LINES

BACKGROUND OF THE INVENTION

This invention relates to an electrical measuring transducer of the two-wire-process type whose output is an impressed direct current and having a controllable resistor as the control element, a counter-coupling or negative feed back resistor, a constant voltage producer, and a pickup for the measured value.

PRIOR ART

Transducers are especially useful in measuring instrument regulating or control circuits for translating a quantity to be measured, for example pressure, rate of flow or temperature, into an electrical quantity, preferably an impressed current flow which can be passed on to the interior of the control circuit, and which is proportional to the quantity to be measured. Measuring transducers whose output quantities are electrical signals generally require auxiliary energy for, say, an amplifier.

For feeding of this auxiliary energy to the transducer conductors are required in addition to the two conductors for the output value. If the transducer includes a controllable electrical resistor, it is possible to employ the transmitting conductors for the output signal as conductors for the auxiliary energy, and eliminate the need for additional auxiliary energy conductors. Such transducers are known as "two-wire" transducers and are described in "Kleines Handbuck technischer Regelvorgange" Weinheim 1964—Fourth edition, pages 278-279. In such transducers, the power supply current is impressed upon the transducer, whose function it is to modulate that current in representation of the quantity to be measured.

These two-wire-transducers are developed as automatic feedback control circuits. If the electrical two-wire transducers are considered in combination with a non-electric input signal or value as quantity to be measured, and an impressed direct current serves as output of the control circuit, then there is an analogy between that input signal and the command input value w in an automatic feedback control circuit. The impressed direct current is then the control value $x$ to be regulated. A measuring pickup converts the non-electrical input to an intermediate electrical signal, for example, a quantity of resistance. By means of a feedback device such as counter coupling resistor, the control value to be regulated is converted into a corresponding intermediate electrical quantity which is connected in opposition to the intermediate signal representing the non-electric measuring input and hence an error signal is formed.

The so produced control deviation (error signal) $x_w$ is fed to an amplifier as a control which actuates adjustment means such as a variable resistor. This construction of a two-wire measuring transducer as a regulating circuit has an advantage in that fluctuating of the D. C. feed and variations of the resistance in the wiring system are balanced out and cannot affect operation.

In another transducer of this type as set out in U.S. Pat. No. 3,503,261 the non-electric input is transformed into an intermediate resistance value in one branch of a bridge circuit. This transducer has the disadvantage in that the auxiliary current necessary for the feed of the bridge is by-passed to the adjustment means. The present invention overcomes the above objections.

SUMMARY OF THE DESCRIPTION

The novel measuring transducer of the two-wire type gives an output as an impressed direct current and included a controllable resistor as an adjusting element, a counter coupling feedback resistor, a constant voltage deliverer and a measuring value pick-up. The controllable resistor, the feedback resistor and the constant voltage deliverer are connected in series and the initial and final terminals of this series are connection points for the output of the transducer. Preferably, the feedback resistor is between the controllable resistor and the constant voltage deliverer.

In a further development of the invention, the necessary auxiliary energy for the operation of the measuring value pickup is tapped from the constant voltage deliverer.

DRAWING

DESCRIPTION OF PREFERRED EMBODIMENTS

Figure 1:
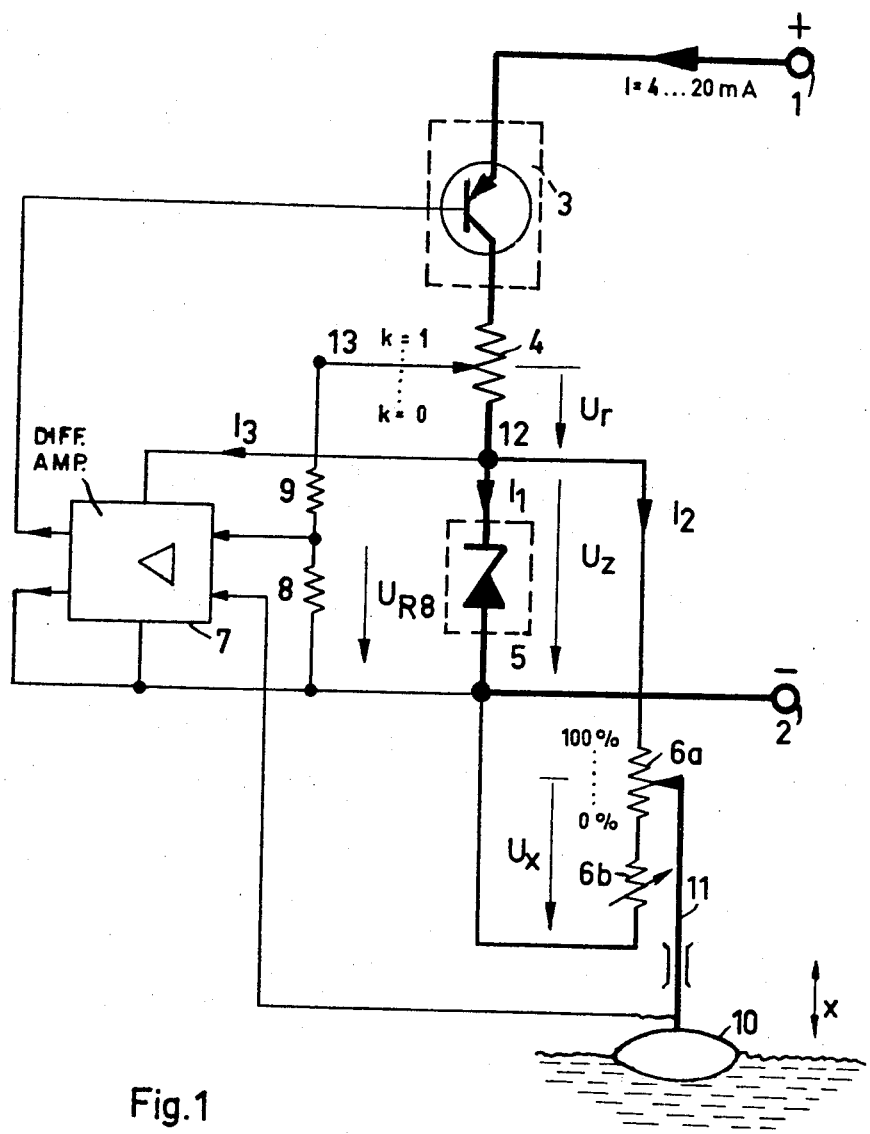
FIG. 1 is a circuit diagram of one form of the invention wherein a potentiometer serves as the pickup.

FIG. 1 shows the first of the preferred embodiments of the invention as a two-wire measuring transducer. Here the input quantity to be sensed and measured is the height of a water level. The output quantity of the transducer is an impressed direct current I whose value varies between 4 ma, corresponding to 0 percent of the input value, and 20 ma corresponding to 100 percent of the input value. The two respective output conductors are to be connected to terminals 1 and 2. The impressed current flows from connector terminal 1 via a controllable resistor 3, shown as a transistor, thence through a counter-coupling or feedback resistor 4, after which the current is divided into three individual currents $I_1$, $I_2$, and $I_3$. Instead of a single transistor, as shown, a cascade of several transistors may be used for the controllable resistor 3. Current $I_1$ flows through a constant voltage device; current $I_2$ through the serially connected resistors 6a and 6b, the former being a potentiometer with a slide tap whose movement responds to the water level, and current $I_3$ flows via the feed current circuit of a difference amplifier 7. It is advantageous to have the counter coupled or feedback resistor 4 between the control resistor 3 and the constant voltage transmitter 5 for in this manner it is possible to connect one of the terminals of the constant voltage device to one of the terminals of the measuring transducer (e.g., terminal 2). In a very simple form, the constant voltage device 5 may be a Zener diode. It is, however, also possible to expand the use of the constant voltage device so that by means of a Zener diode as a reference voltage element a practically constant current flows through the device, and any portion of current I, exceeding this constant value is by passed at the Zener diode. The details and operation of such an arrangement are pointed out below in connection with FIG. 5.

The input quantity to amplifier 7 is the difference between two voltages $U_x$ and $U_{R8}$ which are connected in opposition at the connection point 2. The value $U_x$ is an amount corresponding to the height of the water level as sensed by the float 10 whose vertical movement operates the slide tap 11 of a potentiometer resistor 6a. Thus, $U_x$ represents a command signal in this control circuit. The voltage $U_{R8}$ comprises a constant portion $U_z$ plus a portion $U_r$, the latter being proportional to the impressed current, I. Thus, $U_r$ represents the quantity to be regulated by this automatic control circuit. $U_z$ is the output voltage of the constant voltage device 5, and $U_r$ is the product of the impressed current I and conducting resistance $K \cdot R_4$ lying between the connection point 12 and the slide tap 13. The constant $k$ is dimensionless and takes on any value between zero and unity depending on the position of the slide tap 13. The combined inputs for difference amplifier 7 constitute an error signal and the output of amplifier 7 regulates the control resistor 3 until the voltage $U_{R8}$ dependent on the impressed current I is equal to $U_x$, then the input to the amplifier 7 becomes substantially zero. The value for the impressed current I in terms of non-electrical input $x$ (when $0 \leq x \leq 1$) is shown by the expression $$I = \frac{U_z}{kR4} \frac{R8+R9}{R8} \left[ \frac{R6a}{R6a+R6b} x + \left( \frac{R6b}{R6a+R6b} - \frac{R8}{R8+R9} \right) \right]$$

The equation above shows that the impressed direct current I is proportional to the non-electrical input quantity $x$ which is used in the equation in terms of a fraction of resistor 6a that participates in the formation of voltage $U_x$ (together with the voltage drop on potentiometer 6b). Since the current I cannot take on a negative value the condition $$[R6b/(R6A + R6b)] - [R8/(R8 + R9)] \geq 0$$

must be met. The coordination between non-electrical input $x$ and the electrical output I of the transducer is obtained by the adjustment of the slide 13 of the feedback resistor 4 and by altering the variable resistor 6a. Suppose the slide 11 of the potentiometer is in top position the input is 100 percent or $x=1$. The difference amplifier then modulates the controllable resistor 3 until the voltage drop across resistor 8 is equal to $U_x$ and accordingly to $U_z$. By setting the slide 13 of the feedback resistor 4, the dimensionless factor $k$ is varied until the impressed current I takes on the maximum desired value, say, 20 Ma. With the slide 11 now set at bottom position for zero per cent input, the variable resistor 6b is now so adjusted that a desired minimum value, say, 4 Ma for the impressed current is obtained. By use of these settings any percentage of input will be reflected in a corresponding value between the desired limits of the output.

Due to the practically wattless control of the control resistor 3, the whole impressed current I flows through the resistor. Hence any disturbance variations that were formerly of great concern are quickly regulated out of the impressed current. Moreover it is of advantage in this two-wire transducer to have the feedback resistor 4 connected in between the controllable resistor 3 and the reference voltage element 5. The present transducer exhibits a high dynamic internal resistance with respect to alternating currents which are superimposed on the impressed current I at the connecting terminals. It is therefore, substantially free from oscillation as compared to a damped out DC voltage feed. Since a DC amplifier is used for the control amplifier no special filtering means are necessary.

Figure 2:
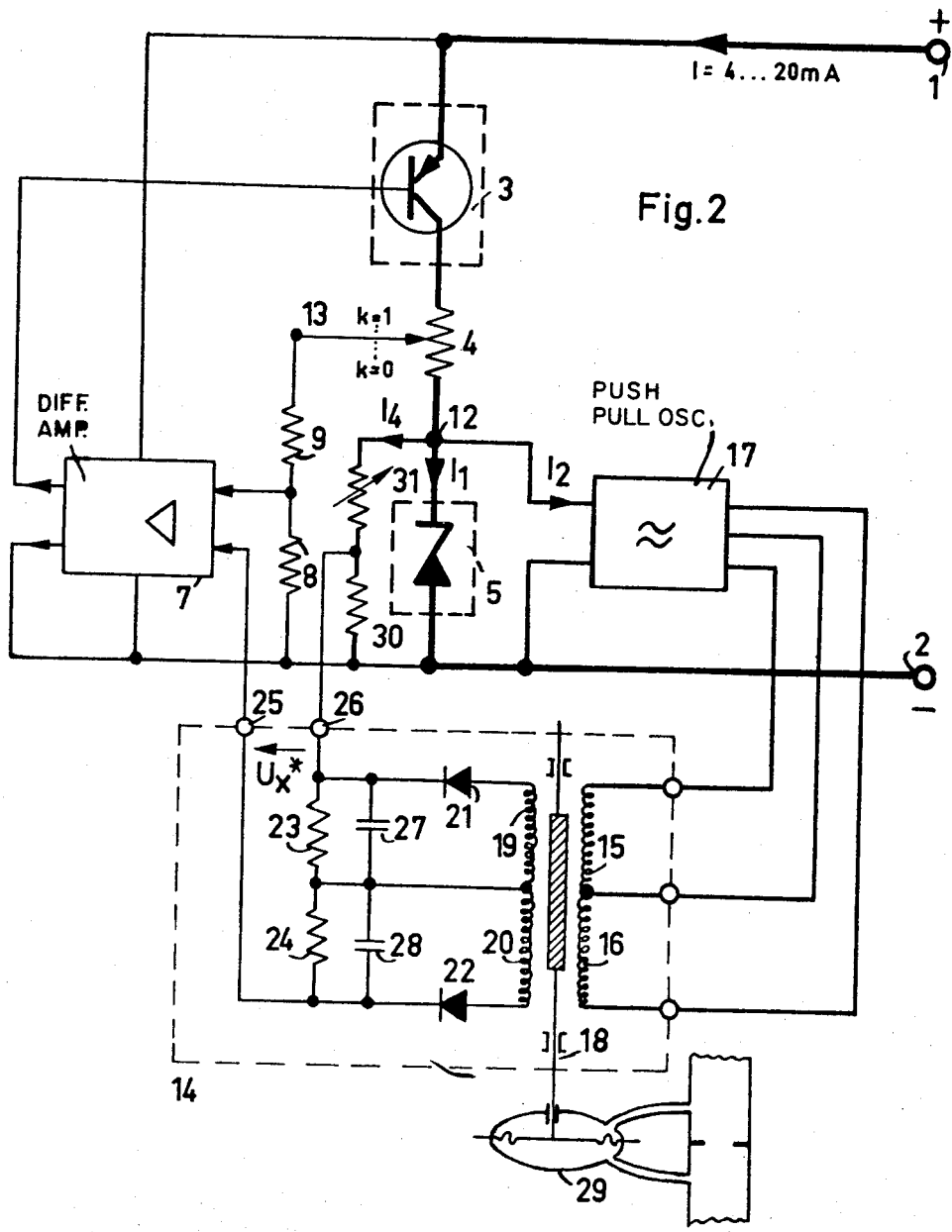
FIG. 2 is a diagram showing a differential transformer as the pickup.
Figure 4:
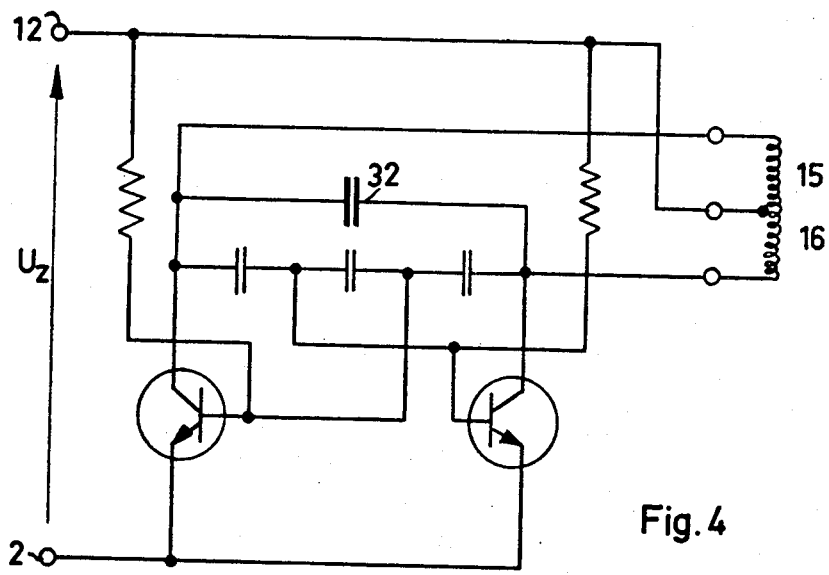
FIG. 4 shows an oscillator symbolically shown in FIG. 2 and 3.

FIG. 2 shows a form of the invention wherein the pickup is a differential transformer 14 whose primaries 15 and 16 are excited by a push-pull oscillator 17 shown in greater details in FIG. 4. A slidable core 18 alters the coupling between the primaries 15 and 16 as well as the secondaries 19 and 20. The alternating voltage from the secondaries are rectified by diodes 21 and 22. The resulting DC voltages are connected in opposition to resistors 23 and 24 and in such a way that the output terminals 25 and 26 of the differential transformer 14 develop a DC potential $U_x^*$ which can take on different values depending on the position of the slidable core 18 and hence on the input value to the transducer. The condensers 27 and 28 serve to smooth out the voltages arising at the resistors 23 and 24 respectively. In this embodiment of the invention the position of the core 18 is dependent on a differential pressure means 29, but the core may be positioned by other types of sensors, as by the float of FIG. 1.

In the example of the invention according to FIG. 2 one connection of the feed current circuit for the difference amplifier 7, in contrast to the arrangement in FIG. 1, is now connected to the terminal 1. The variation from FIG. 1 (wherein the feed circuit of difference amplifier 7 is connected to point 12) is possible only when the difference amplifier 7 is so designed that the feed current it requires and which indeed by-passes the feedback resistor 4, is negligibly small compared to the lowest value $I_{min}$ of the impressed current I. Otherwise it must be held constant with precision, which is not contemplated.

The input circuit of the difference amplifier 7 contains a network of resistors 8, 9, 30 and 31, which form two voltage dividers from resistors 8, and 9 as well as 30 and 31. The input quantity of amplifier 7 in FIG. 2 is determined by the sum of the voltage drops across resistors 8, 23, 24 and 30 with due regard to sign. The coordination between the non-electric input quantity and the impressed current I is effected in a manner similar to that for FIG. 1 by the adjustment of the slide 13 and altering the resistance value of resistor 31. The constant voltage device 5 supplies or feeds the oscillator 17 as well as the voltage divider composed of resistors 30 and 31.

An especially favorable form of the invention is obtained when the primary windings 15 and 16 of transformer 14 also serve to determine the frequency of the oscillator 17. The circuitry of such an oscillator is shown in FIG. 4. The push-pull oscillator 17 is fed by constant voltage $U_z$ at terminals 2 and 12. The primary windings 15 and 16 along with condenser 32 determine the frequency of the oscillator 17.

Figure 3:
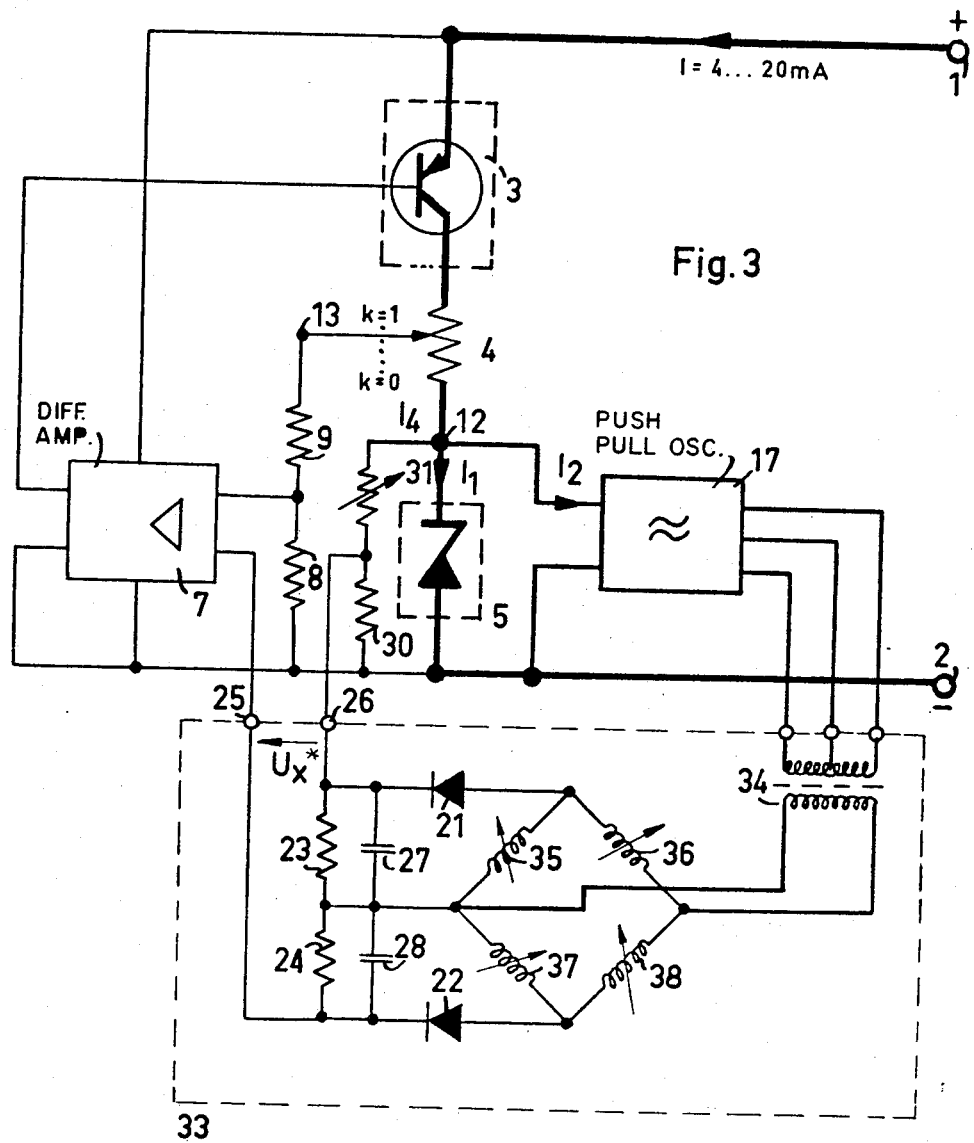
FIG. 3 is a diagram showing an inductance bridge as the pickup.

FIG. 3 shows another form of the invention somewhat similar to FIG. 2 in which an inductive bridge circuit 33 serves as the pickup for the quantity to be measured. The output voltage of the oscillator 17 is connected through an isolating transformer 34 to the feed diagonal of a bridge containing four respective inductive resistors 35, 36, 37 and 38. The alternating voltage developed by the measuring diagonal is rectified by diodes 21 and 22, so that a DC voltage $U_x^*$ appears across points 25 and 26 as a measure for the alternating voltage at the measuring diagonal of the bridge. When the inductive resistors 35, 36, 37 and 38 are in the form of coils, their coupling and hence their impedance is made to depend on a non-electric input quantity.

Figure 5:
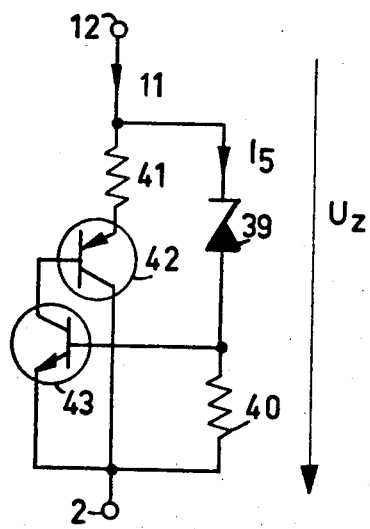
FIG. 5 shows the circuit of a constant voltage deliverer by which the current flow is held practically constant and independent of the output current of the measuring transducer by means of a reference voltage element.

As was mentioned in connection with FIG. 1, the constant voltage producer 5 may be a Zener diode. Since however, a current I flowing via this element 5 becomes altered, it is advantageous to employ a two-terminal network in connection with a Zener diode which permits a portion of the current I, to by-pass the Zener diode, in order to hold the current flowing through the Zener diode constant within the error due to the remaining portions of the regulating system. Such a constant voltage producer is shown by the circuitry of FIG. 5. The terminals of the two-pole network correspond to the terminal points 2 and 12 in FIGS. 1, 2 and 3. If the current flowing through the constant voltage producer 5 is small, then it flows via the serially connected Zener diode 39 and resistor 40, the by-pass path via resistor 41 and transistor 42 is blocked. Should the current I through the element 5 rise, the voltage drop across the resistor 40 would also rise until threshold voltage of the base of transistors 43 is exceeded and the transistor 43 becomes conductive. The transistor 42 becomes also conductive and, together with the resistor 41 a current path parallel to Zener diode 39 is established. Due to the by-pass action of resistor 41 and transistors 42 and 43, the current $I_5$ flowing through Zener diode 39 and resistor 40 is maintained constant up to the residual regulator error. For this reason the voltage drop across resistor 40 also remains constant. This drop is added to the constant drop across the Zener diode 39, so the result is a constant drop $U_z$ between two points 2 and 12.

If the employed pickup possesses some function related to temperature it is possible to compensate for it by making the constant voltage deliver 5 also sensitive to temperature. A simple way of doing this is to make resistor 40 in FIG. 5 dependent on temperature.

The transducer has a further advantage in that a wide variety of pickups can be used for sensing the non-electric quantities.

The invention claimed is:

1. A measuring transducer for converting a quantity to be measured into an electrical signal, the transducer having but two lead-in wires for providing voltage and current to the transducer as power supply therein, and wherein the measured quantity is represented by electrical signal that passes through the same wires and as modulation of the current fed through the transducer as power supply, the combination comprising:

a series circuit connection including an adjustable resistance means, a feedback resistor, and a constant voltage device connected in series to each other, the series circuit connected to said lead-in wires, so that at least substantially all of the power supply current passes through the adjustable resistance means, and only a portion of the load current flows through the constant voltage device to obtain the constant voltage there-across;

pick up means connected to and directly across said constant voltage device and operated and powered exclusively by the constant voltage across the constant voltage device, independent from any voltage drop across the feedback resistor or a portion thereof, the pick up means being additionally responsive to said quantity to be measured and providing a first electrical signal representative thereof and referenced against one of the lead-in wires the first electrical signal being developed by the pickup means independently from any voltage drop across the feedback resistor or a portion thereof;

first circuit means connected to said feedback resistor independently from the pick up means for deriving from the feedback resistor a second signal that is proportionate to said current and referenced against the potential of one of the lead-in wires; and second circuit means connected to said series circuit for deriving power therefrom and having signal inputs connected respectively to receive said first and second signals and providing a control signal, the second circuit means connected to the adjustable resistance means for controlling the current flow through the adjustable resistance means in dependence upon the control signal so that the magnitude of the power supply current represents said measured quantity.

2. A transducer as claimed in claim 1 the feedback resistor being connected in-between the adjustable resistance means and the constant voltage device.

3. A transducer as claimed in claim 2, one of the terminals of the constant voltage device being one of the two terminals for output conductors for the transducer.

4. A transducer as claimed in claim 1, said constant voltage device comprising a Zener diode as a reference voltage element; a resistor connected in series therewith, and a third circuit means connected across the Zener diode and the latter resistor and controlled by the voltage drop across the Zener diode and the resistor so that the current flowing through the Zener diode is held constant except for a residual error for maintaining the set point of the control by and in the third circuit means.

5. A transducer as claimed in claim 4, the said latter resistor being temperature sensitive to compensate for temperature effects arising in the pickup.

6. A transducer as claimed in claim 1, the pickup being a potentiometer across the constant voltage device and having a slide whose position is a measure of the input to the transducer.

7. A transducer as claimed in claim 1, the pickup being a differential transformer having primary side and an oscillator connected to the constant voltage device and powered thereby between the device and the primary side.

8. A transducer as claimed in claim 7, the coils of the primary side also serving as inductors for defining the frequency of the oscillator.

9. A transducer as claimed in claim 1, the pickup means being an inductive bridge circuit, and an oscillator fed by the constant voltage deliverer intermediate the latter and bridge for feeding the bridge.

10. A transducer as claimed in claim 1, said second circuit means including an amplifier connected to effectively vary the controllable resistor in response to changes of state in the pickup, the current for the auxiliary power to operate the amplifier being so small in comparison with the impressed current that variations in the operating current does not substantially affect the sensitivity of the the transducer.

\* \* \* \* \*